Aug. 26, 1924.
E. P. STEWART
1,506,729
SCREEN FOR MOVING PICTURE PRODUCTION
Filed May 16, 1919    2 Sheets-Sheet 1
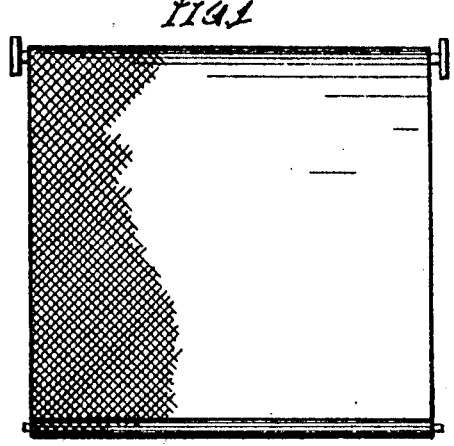
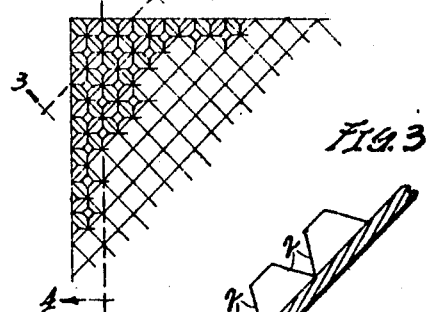
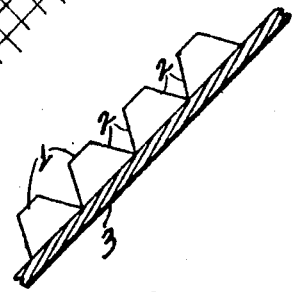
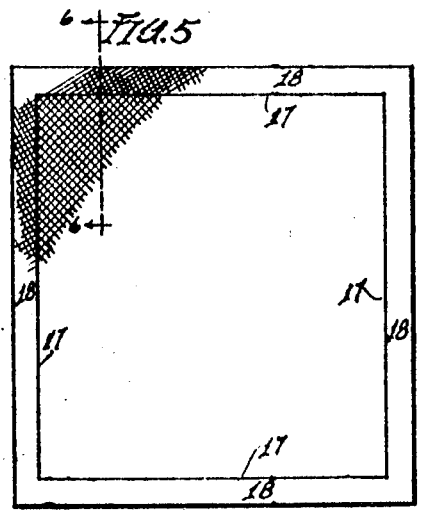
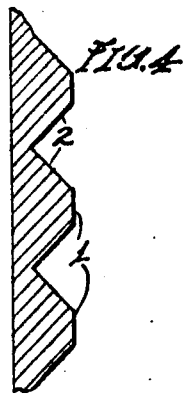
INVENTOR
EDNA PEARL STEWART
BY C. A. Enochs
ATTORNEY Aug. 26, 1924.
E. P. STEWART
1,506,729
SCREEN FOR MOVING PICTURE PRODUCTION
Filed May 16, 1919      2 Sheets-Sheet 2
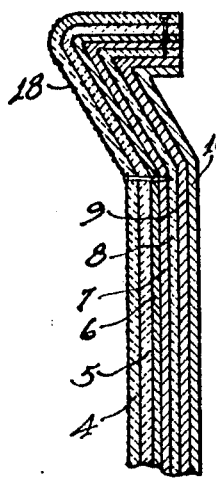
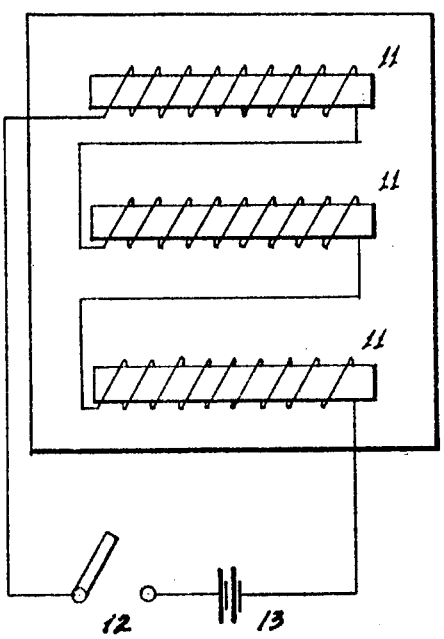
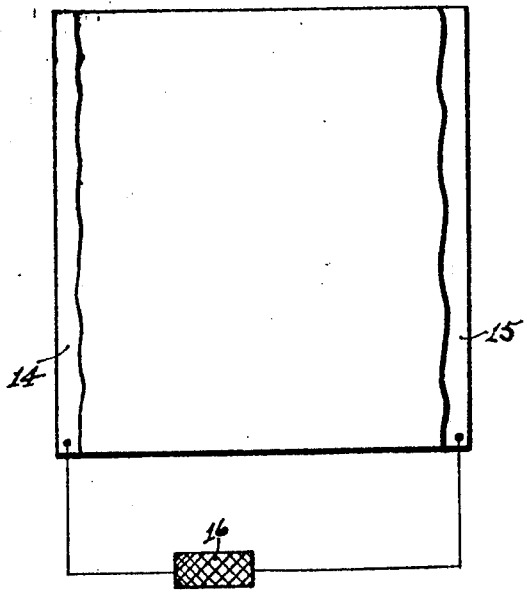
INVENTOR
EDNA PEARL STEWART
BY C. E. Enoch
ATTORNEY Patented Aug. 26, 1924.

1,506,729

UNITED STATES PATENT OFFICE.

EDNA PEARL STEWART, OF MINNEAPOLIS, MINNESOTA.

SCREEN FOR MOVING-PICTURE PRODUCTION.

Application filed May 16, 1919. Serial No. 297,588.

*To all whom it may concern:*

Be it known that I, EDNA PEARL STEWART, a citizen of the United States, and a resident of Minneapolis, in the county of Hennepin and State of Minnesota, have invented certain new and useful Improvements in Screens for Moving-Picture Production, of which the following is a specification.

My invention relates to screens for the pictures projected by light and especially to the pictures projected through a motion picture film. Among the objects of my invention is to provide a screen for such pictures possessing the maximum intensity of illumination, so that a shadow picture may be seen at a great distance with clearness and distinctness and from nearly all angles to the face of the screen and at the same time to mechanically direct the regular reflected light radiating from the screen in certain directions not within the line of vision of those observing pictures projected on the screen, but the shadows of the pictures are made visible to the observer on certain small segregated areas that have means for softly diffusing the light, thereby providing a brilliantly illuminated screen devoid of glare.

Another object of my invention is to provide a screen that possesses the quality of automatically adjusting its apparent intensity of illumination to the distance at which it is viewed, in such a manner that the pictures projected thereon shall appear to have the same amount of clear outlines and definition of images at any point within a given radius, said radius being very greatly enlarged beyond the practical viewing or optical, radius of screens now used, both as to distance and as to the angle from which it is viewed.

Another object of my invention is to provide a screen that shall mechanically break up the heavy shadows of the film or photographic pictures in such a manner as to give the images greater definition and to etch the flat fields of light with uniformly spaced dots of shadow in such a manner as to give the images better definition, and a somewhat rounding of the images that will have the general effect over the whole picture of chiaroscopy and an apparent third dimension.

Another object of my invention is to provide a screen that shall absorb the ultra-violet light projected upon it from the projecting lamp, which is a known and recognized source of eyestrain and nerve strain, quite often very serious in its results. See Steinmetz "Radiation, light and illumination," p. 37.

Another object of my invention is to provide a screen that shall mechanically and chemically polarize the light radiated therefrom, thereby eliminating the eyestrain that results from attempting to view pictures through haze, and optically confusing radiations vibrating in all planes.

Another object of my invention is to provide a screen the reflective element of which possesses selective absorptive powers and absorbs the extremely short and the extremely long wave vibrations of the projected light, in order to lessen eye fatigue of those viewing pictures projected thereon, see Steinmetz, "Radiation, light and illumination," arts. 25, 26 and 27.

Another object of my invention is to provide a screen that shall be periodically self-illuminant, by means of an element contained therein which the projected light shall cause to fluoresce, said fluorescence to maintain during that period of projection of the picture when the shutter attached to the projection lamp, intercepts the projection light from the screen, said fluorescence to be subjected to a decay timed with the time period of said shutter, said decay to be effected by an element contained in and attached to said screen, said periodic luminescence for the purpose of avoiding the eyestrain due to so called "flicker," now prevalent on screens for motion pictures, and also to further intensify the general illumination resulting from a given amount of radiation from the projection lamp, and also the reduction of short waves of light to longer waves, so that short and high frequency waves may be rendered longer and lower frequency and be within the harmless to eyesight, range of vibrations.

Another object of my invention is to provide a screen that shall give more or less tint of colors to films that are developed in black and white only, in order to relieve the unpleasant effect of the pictures having no suggestion of color.

Another object of my invention is to provide a screen that may be viewed in daylight, for the use of schools, lecture rooms, hospitals, stadiums and like places.

Another object of my invention is to provide a screen that shall absorb the defects in projections from films that have been scratched, thereby producing the source of eyestrain known as "rain."

Another object of my invention is to produce a screen that shall present the motion pictures in such a manner that they may be viewed from any angle whereby any object may be clearly viewed, without changing the outlines or configuration of the images or any distortion of said images whatsoever, thereby avoiding one of the most unpleasant features of viewing motion pictures on the screens now in use.

Another object of my invention is to provide a screen that shall eliminate the so-called "blur," now seen in the moving images in motion pictures, which is also a source of eyestrain and nerve strain.

With these and incidental objects in view, the invention consists of certain novel features of construction and combination of parts, the essential elements of which are hereinafter described with reference to the drawings.

In the drawings, Fig. 1 is a conventional diagrammatic drawing of a front view of a screen embodying my invention; Fig. 2 is a fragmentary, diagrammatic drawing showing a detail of the configuration of the front view of the screen; Fig. 3 is a fragmentary, diagrammatic view of the configurations of a sectional view of a section of that part of the screen which is shaped and formed in accordance with certain specifications and shows the outlines of line 3—3, Fig. 2. Fig. 4 is a similar section taken on line 4—4, Fig. 2. Fig. 5 is a fragmentary, diagrammatic drawing showing the manner in which a border may surround the projection face of the screen, that will avoid the diffusion of light from the screen into the immediate neighborhood. Fig. 6 is a fragmentary section of the view taken along the line 6—6, Fig. 5. Fig. 7 is a rear view of the screen showing means for creating a magnetic field through the screen, and Fig. 8 is a similar view showing the manner in which the screen may be electrified.

Referring to the drawings, in which similar reference characters refer to like parts on all the figures thereof, 1 indicates the truncated top of the prisms formed on my improved screen; 2 indicates the angular refracting faces of said prisms; 3 indicates the backing for the prisms which is composed of celluloid, a layer of gold leaf 5 or paint, fluorescent material 6, brilliant metallic paint 7, fish glue or oil 8, a layer of fish glue, linseed oil and lamp black 9 and a sheet of rubber 10.

As shown in Figure 7, I provide along the back of the screen a series of electro-magnetic coils 11, electrically connected through a switch 12 to a source of electric current 13, so that the gold leaf may be subjected to an electro-magnetic action and this action in turn affects the light waves received by the screen. I obtain a similar result by connecting the edges 14 and 15 of the gold leaf through any sort of electric machine 16 that will electrify the gold leaf.

As shown in Figs. 5 and 6, the surface of the celluloid having the pyramids thereon and the gold leaf reflectors is brought beyond the edges 17 along the inclined surfaces 18 so as to form a border for the screen.

In support of the object first mentioned in this specification, I use as a reflecting element a sheet of polished gold leaf, which is presented at right angles to the source of projection light. The use of this metal in particular is manifold in its adaptability to a motion picture screen, first that it has by test been proven to have the best reflecting powers, in experimenting in solar heat engines in California, and so stated by them as well as in theory by most authorities in illumination. Please see Steinmetz, "Radiation, light and illumination," page 301 lines 17 and 18, as regards regular reflection. Copper gives a color not desirable in this instance and brass will tarnish, and cannot be rendered malleable and reduced to a semi-transparent, flexible leaf, nor does it have the color values of gold and gold leaf. Hence gold leaf presents a desirable material as a reflector of selective absorbtive power suited to the invention but I do not restrict myself to the sole use of this material, as there are altitudes wherein color saturation is to a degree which makes it sometimes advisable to combine it with other agents and elements. I have found aluminum leaf suitable for this as also those formulæ that produce so called white gold. Aluminum has the fluorescent quality quite marked when illuminated by the electric arc as also has gold leaf. Gold leaf also lends itself to a flexible, close adherence to the supporting and flexible portion of the body of the screen, and permits of the screen as a whole being rolled into a quite small compass in shipping. Also, is a brilliant reflector as soon as applied to the main body of the screen. It can be dissolved in an acid and used in a solvent state and applied to the main body of the screen as can other materials that could be substituted for the gold, which makes the manufacture somewhat more efficient as to time and labor. Another and extremely valuable quality of gold leaf is its selective absorption for the optically harmful ultra-violet rays and the violet rays to an extent.

Having then a reflector giving the maximum intensity of light best adapted for vision within the distance in which a picture screen will be used, there remains to arrange some means whereby this directly regular reflected light may be utilized in the illumination of the pictures projected thereon without materially lessening its intensity, and to provide a means for diffusion of a portion of the projected light in a plane between the spectator and the reflector. These two objects and operations I have encompassed within one unit of action and practically one element, namely, uniformly spaced and very small spots of a translucent material situated or positioned in front of the reflector, in one plane and parallel to the front and reflecting surface of the reflector, and having their surfaces not highly reflecting.

It will be understood in the case of the screen, that the light from the projection lamp will impinge upon the diffusing face of the said translucent spots and the shadows created by the film through which the said projection is made, will be visibly sustained upon these said translucent spots whose front faces are not highly reflective, and what is of equal importance, the projection light being reflected by the gold leaf reflector, will be visible through these translucent spots and furnish an illumination for the shadow picture that can be agreeably sustained by the eye. At this point I have arranged a mechanical direction of the light that impinges on the mirror like reflector of gold and the light that is reflected from it, and at the same time and with the same element support the translucent spots, by the following method and means. Illustrating one individual translucent spot positioned in front of the gold leaf reflector I refer to the drawing of Fig. 3. Said unit consisting of a transparent material shaped in the form of a quadrangularly based, truncated apex, pyramid, the said truncated apex or top, being rendered translucent and the outer face of same is not highly reflective, and is the surface that is presented at right angles to the projection light. The base face of this pyramid is in a plane parallel to the face of the pyramid just described and is that portion of the unit farthest from the spectator. This said base face is the support of the gold leaf that is herein mentioned as the means of reflecting the projection light. It will be seen then that projection light 1, if impinging on the transparent side of the pyramid 2 is in part reflected and in part refracted, according to its angle of incidence, and that part which is refracted 3, will reach the mirror-like reflector of gold leaf positioned at the base of said pyramid, 4, and according to the angle of incidence on same, be reflected to the rear face of the translucent truncated top of the pyramid 6 and by the refractive power of the transparent pyramid, be directed at emergence from said pyramid at an angle which will be in direct line of the adjacent face of the nearest pyramid, forming the next unit of illumination. It will be seen that regularly reflected light is reflected many times between the adjacent faces of the transparent pyramids and in a direction nearly parallel to the plane of the face of the screen being presented to the projection light. I have by this means then supported a mirror like reflector reflecting regular reflected light at a tangent to the eyes of those viewing the pictures on the screen and provided an area of translucent material intervening between said regular reflected light and the observer, whereon a shadow may be easily visible and illuminated with irregular reflected light and diffused light. An aggregation of the unit described as a transparent pyramid having a quadrangular base and a quadrangular, truncated, translucent top or apex, and positioned in front of a mirror like reflector is seen in a fragmentary, diagrammatic drawing Fig. 2. If then a shadow picture is being projected on a multiplicity of these pyramids arranged so that the bases and the truncated tops of said pyramids are in one plane and parallel to each other, the mechanical device for supporting small spots of translucent material positioned in front of a reflector of maximum intensity, and so directing the regular reflected light from said reflector so that said regular reflected light cannot enter the eyes of those observing pictures being projected on the said translucent spots, has been effected. In the production of a screen operating in this manner, use may be made of a sheet of homogeneous transparent material having plane faces parallel to each other. One face of same may be rendered translucent by any means whatsoever, plenty for the purpose not being new in method, and the other face of said transparent sheet having applied to it gold leaf or gold leaf in solution which will later dry and adhere to the sheet so as to form a bright and intensely illuminated mirror under projected light. Forming grooves across the face of the sheet which has been rendered translucent lines 2—2, Fig. 3 of original drawings, in such a manner as to leave the faces of the groove so made, clear polished and transparent, and forming another set of grooves across this same face of the transparent sheet on its translucent face, at right angles to the grooves first formed, will produce the pyramids.

In support of the second object mentioned in this specification it is noted "prismatic refraction affords a means * * * of increasing the size of the virtual illuminant," so that if a translucent area be illuminated, positioned in front of a prismatic body, an image projected thereon will appear to have the same amount of illumination, within the above mentioned distance. The form of the pyramids and their transparent nature will of a necessity render them prismatic. It will then be seen that I have shown means whereby a shadow picture may be projected on a multiplicity of translucent spots, in diffused light whose entire areas increase in apparent illumination as the relative distance of observation increases, and illuminated that shadow with both the impinging projected light and a highly illuminating reflected light, and surrounded those shadow pictures with illuminating spots of regular reflected light, by prisms positioned at the sides and rear of said translucent areas, and that while the maximum amount of illumination is secured for the shadow pictures, no regularly reflected light is permitted to enter the eyes of those observing those pictures, and that the thus increased amount of illumination enables the eye to clearly perceive the shadow pictures at a greater distance than heretofore, when no such means of highly illuminating the shadow pictures has been employed. As the pyramidal prisms described have a reflecting mirror positioned at their rear faces, said mirror will by the law of refraction in a refracting body, present images projected on its other surfaces in such a manner that in this case, the shadows forming the pictures, may be seen from very acute angles to the face of the screen. For the same reason of refraction of the light projected on and through these pyramidal prisms, the apparent illumination does not fade at the angles on the screens now in use, but persists to a very acute angle to the face of the screen.

The effect of apparent third dimension in the projected film, is produced mainly by interposing the small spots whereon the shadows are visible with small spots of light whereon no shadows are visible, and these alternate spots of visible translucency and spots of regular reflected light, (being reflected in a plane parallel to the face of the screen), have much the same action on the shadow pictures as does a socalled half tone screen used by engravers and printers and photographers in producing the half tone effects in wash drawings and photographs. The shadows are not visible where they impinge on the transparent sides of the pyramidal prisms, but the light reflected as described, at those positions, shines through the shadows and really create light spots in the shadows, and the translucent, diffusing truncated tops of the pyramidal prisms, serve to contrast to these light spots so as to have the effect of the dark spots in a half tone, with the exception that in the case of the screen, the definition is much greater as these apparently darker spots are in themselves illuminated by diffused light both upon their front faces and by the light reflected from the gold leaf mirror positioned in their rear.

The absorption of the ultra-violet light is due to the selective absorption qualities of the reflector used in the screen and above described.

Many fluorescent materials increase their conductivity of electric currents during the excitation from light. Therefore if an electric current was sent over the gold leaf, to which adhered a coating of fluorescent material, the conductivity of the current would be increased during the light flux from the projection lamp, and the resultant rise in temperature tend to a quick decay of the visible fluorescence. Again the theory of ionization of fluorescent materials is ably supported by the experiments of Goldman, and in the case of the screen, the electrified gold leaf would have some of the functioning of an electrode, inasmuch as it would form the medium by which the electric current is conducted. Not only is commercial gold leaf thin to semi-transparency, but is full of minute holes, and if coated with a substantial thickness of a material composed of one or more fluorescent materials, the combination of gold leaf and fluorescent will visibly fluoresce when the proper radiant energy is applied to said combination, in this case being the radiant energy of visible and invisible light, heat and electric current.

It is believed that when a slow emulsion is used in taking a picture the wave lengths of color are registered in the emulsion according to their respective lengths and frequency: that when such a film or the positive from such a film is projected by ordinary methods, that there is not sufficient dispersion to separate the wave lengths projected through the film, to prevent them overlapping and producing white images with black shadows. The screen however being able to divide those impinging rays into prismatic dispersion, the original registering of the respective wave lengths were reproduced. The fluorescing quality of the gold leaf lends a tint resembling flesh color to any film that the inventor has seen tried, but from emulsions prepared to be especially sensitive to the short waves of light only, very little color appears on the screen, as is also the case where the photographer has used a color screen over the lens in photographing the negative. In other words, the prismatic construction of my screen by the law of prismatic dispersion, reproduces whatever of color values which have been registered upon a film.

The perfect control of the projection light produces a projected picture that can be perceived in almost any light or quantity of light, which would be impossible in screens not polarizing the light reflected from the screen.

Scratches in films produced on screens heretofore, the appearance of drops and lines running down across the screen and tending to obscure the images and being particularly tiresome to view. However by the use of a prismatic difraction screen, the tiny shadows of scratches in the films which causes this "rain," are dispersed by the prisms and also the brilliant gold leaf reflector illuminates these dispersed shadows from the rear, so that as shadows that may be visible on the screen, they cease to exist. My screen so disperses and destroys these scratch shadows.

If an image is projected on any visible line, the retina will focus on the image and see the image if so desired, but the part of the retina upon which the line falls as an image will influence the general impression received by the brain and the image superimposed upon the line, will appear to have linear distortion. In my invention, I have carefully avoided this phenomena, by providing a projection surface divided into equilateral quadrangularly based truncated pyramids, with the lines of their connected bases, at an angle of 45 degrees to the perpendicular axis of the projection surface of the screen. These individual units of projection surface, are too small to be discerned optically, excepting at a range too close to observe a projected picture, therefore the eye observing the projected picture sees the image upon the truncated tops of these units of projection, but cannot see the units individually, hence the eye carries no impression of lines in the surface of the screen, to the brain, and as all these truncated tops of the pyramids are in one plane, there is no distortion of the images projected on this screen. The brilliant gold leaf mirror at the rear faces of these pyramidal units of projection surface, reflects the effect so produced as above, for such of the rays of light that would otherwise be absorbed, if there was no backing behind these pyramidal prisms, by the air in the rear of the screen and any reflector excepting one of bright, non-corroding metal, would not effectively return these rays to the observer positioned in front of the screen. Also, on account of a system of pyramidal prisms positioned in front of a brilliant mirror, the distortion in other screens which is due to the screen projection surface not being in exact right angle to the projection light, is not apparent on my screen unless the angle of projection exceeds the angle of the grooves forming the sides of the pyramidal prisms, which for ordinary use should be near the angles of the crystal prisms found in atmospheric moisture crystallization,—60 degrees. This degree is not always necessary or advisable, as size of theatre and length of throw of the projection light may vary this general rule as may also the refractive index of the transparency used in making the pyramidal prisms.

If a moving object is photographed in a succession of individual photographs, and those photographs are projected on a screen, if the screen is of sufficient brilliancy, the retina of the eye will retain the impression of one photograph until superseded by a following, and brighter image impinging on the retina,—by "brighter," meaning that the image being retained by the retina is fading in brilliancy as time passes,—the rods and cones vibrating with the waves of light from the former image, will begin to vibrate from the light from the secondary image, and while the new impressions are at the higher state of vibrations and necessarily producing the brighter images, the impression of the first image is still in the retina, and the first impression will resolve into the second. This of course is general knowledge, and the basis of the art of motion pictures—retinal retention of images. Very true, if the second impression is made on the retina before the first one has ceased sending its impression to the brain, and if the second impression is of sufficient brilliancy to blot out the first impression. These two "ifs" have proven a mechanical stumbling block in the art of motion picture perfection in the former screens. When screens have been used of the required brilliancy to eliminate "blur."—the word used in the art to represent the individual projected photographs being partially visible,—then that screen was so highly reflecting that it produced glare, and of the two evils, the blur appeared preferably. There was glare for the reason that no means was provided to deflect the regular reflected light from entering the eyes of the observers of the pictures being projected. The diffusion in most cases is accomplished by a roughened and broken surface and with mat surfaces. However my screen has been shown to possess the required brilliancy of reflection to cause the proper retinal retention, and of so high a reflecting power that the succeeding individual photographs reach the eyes in time, to avoid loss of impression of the first image before the second one makes its impression. Therefore my screen successfully eliminates blur, glare, "rain," "flicker" and distortion, and the ultra-violet ray eyestrain, and lends a pleasant tint to all films and much color to some, and can be operated in theatres of immense sizes and out of doors and in daylight. All this with less flux of projection light than is now employed on the screens in use, even in small theatres.

While I have described my invention and illustrated it with several particular designs, I do not wish it understood that I limit myself to this construction or the particular materials mentioned herein, as it is evident that the invention may be varied in many ways within the scope of the following claims.

I claim:

1. A screen for projected pictures comprising a system of prisms, the bodies of which are transparent to light, and are light refracting, and certain of the faces of each prism are transparent and certain other faces of the prisms are translucent.

2. A screen for projected pictures comprising a system of pyramidal quadrangularly based, truncated apex prisms, whose base lines join in a manner to form a body having the faces of said bases in one plane.

3. A screen for projected pictures comprising a system of pyramidal prisms, the base lines of which are joined in such a manner that the faces of said bases are in one plane, and the apices of the pyramids truncated, said truncations being translucent and non-glazing.

4. A screen for projected pictures comprising a system of pyramidal truncated prisms having transparent faces and translucent faces, covering a transparent body of the prisms, the base lines of said pyramidal prisms being joined so that their largest and base faces are in one plane, and said base faces transparent, said joined transparent and polished base faces supporting a material of high reflective power.

5. A screen for projected pictures comprising a system of pyramidal prisms whose longest, and base lines are joined so that the base faces form a continuous sheet in one plane, said base faces to support a closely adhering material of high reflective power but semi-transparent, and this semi-transparent reflector supporting a closely adhering material which has power to fluoresce.

6. A screen for projected pictures comprising a system of pyramidal prisms having their longest and base lines joined in such a manner that the faces of said bases are in one plane and form a continuous sheet, said base faces to be transparent and polished and support a semi-transparent reflecting material, which in turn supports a closely adhering fluorescent material, over which is applied a material composed of fish glue and oil and lamp black.

7. A screen for projected pictures a combination comprising a system of pyramidal prisms whose longest lines are joined in a manner that the largest faces will form a continuous sheet of transparent material in one plane, said faces being transparent and polished and supporting a semi-transparent reflecting element, said reflector being covered with a fluorescent material and means to increase the speed of the decay of the fluorescent material.

8. In a moving picture screen, the combination with a receiving surface, of a medium pervious to light positioned in front of said surface, multiple truncated pyramids formed in the outer surface of said medium, the top faces of said truncated pyramids being rendered translucent, but not highly reflecting.

9. In a moving picture screen, the combination with a series of superimposed layers in the following arrangement: a medium pervious to light waves, a sheet of gold foil, a coating of fluorescent material, a coating of metallic paint, a coating of fish glue and oil, a coating of fish glue, linseed oil and lamp black, and a sheet of rubber.

10. In a screen for projected pictures a combination with a semi-transparent reflecting receiving surface, of a medium pervious to light consisting of transparent areas and translucent areas and formed into truncated pyramidal prisms the lines of the bases of said pyramids so arranged as to prevent linear distortion of the images in the projected pictures, being positioned at 45 degree angle to both the horizontal and the vertical axis of the screen.

11. In a screen for projected pictures a combination of a semi-transparent reflecting receiving surface, of a system of truncated pyramidal prisms positioned in front of said reflecting surface, symmetrically arranged, the rows of said pyramids being positioned at 45 degrees to the vertical and the horizontal axis of the screen, said prisms having their transparent sides so positioned as to deflect the regularly reflected light away from the line of vision of those viewing pictures projected on the translucent areas of the prisms, said semi-transparent reflecting surface supporting a fluorescent material applied to its rear face said fluorescent material having means applied for periodically extinguishing the visible fluorescence of said material.

12. In a screen for projected pictures the combination of a sheet of transparent material formed in truncated pyramidal prisms with transparent highly reflecting side faces, between which the projected light is reflected many times in a plane parallel to the face of the screen; said spots of reflecting light being visible through the shadows forming the pictures projected on the screen, alternated with small area of translucent spots which occur on the truncated tops of the pyramids, and comprising the diffusing element of the screen face, said translucent spots making the shadows of the picture projected on the screen visible to the eye, said spots of parallelly reflected light alternating symmetrically with the shadows of the translucent spots forming a half toning device giving apparent third dimension to the projected pictures thereon.

13. In a screen for projected pictures a combination with a reflecting receiving surface, a medium pervious to light, positioned in front of said reflecting surface, said medium having multiple truncated pyramidal prisms formed in its outer surface certain faces of which being transparent and certain faces of which are translucent and non-glazing, said system of truncated pyramidal prisms forming a polarizing body whereby the reflected and the refracted and the diffused light radiating from the screen is polarized.

14. In a screen for projected pictures a combination with a reflecting receiving surface, a medium pervious to light positioned in front of said reflecting surface, said medium being formed in multiple prisms, having both transparent faces and translucent faces, and so positioned and formed as to polarize the light radiating from the screen, a means for electrifying the reflecting surface, an electric current traveling across said reflecting surface, the lines of magnetic force accompanying the electric current passing through the material pervious to light and said lines of magnetic force coinciding with the light reflected from the said reflecting receiving surface which receives polarization by refraction through certain transparent faces of the said pyramidal prisms, so that the pictures projected on the screen surface may be observed in a magnetic field, and polarized light.

15. In a motion picture screen, a combination of a reflecting surface, of a medium pervious to light positioned in front of said reflecting surface, said medium formed in multiple prismatic pyramids having transparent faces and translucent faces, and said reflecting surface of a material having selective absorption of light waves, and absorbing the ultra-violet light.

ENDA PEARL STEWART.